(12) United States Patent
Wang et al.

(10) Patent No.: US 7,889,374 B2
(45) Date of Patent: Feb. 15, 2011

(54) SYSTEM AND METHOD FOR ROUTING ELECTRONIC DOCUMENTS FOR PROCESSING VIA TRANSIENT E-MAIL ADDRESSING

(75) Inventors: Jianxin Wang, Trabuco Canyon, CA (US); Truc Nguyen, San Diego, CA (US); William Su, Riverside, CA (US); Peter Tran, Garden Grove, CA (US)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1060 days.

(21) Appl. No.: 11/625,638

(22) Filed: Jan. 22, 2007

(65) Prior Publication Data

US 2008/0174805 A1    Jul. 24, 2008

(51) Int. Cl.
*G06F 3/12* (2006.01)
(52) U.S. Cl. .................................. 358/1.15
(58) Field of Classification Search ............. 358/1.15
See application file for complete search history.

(56) References Cited

U.S. PATENT DOCUMENTS

2003/0063309 A1* 4/2003 Parry .................... 358/1.15
2003/0095281 A1* 5/2003 Parry .................... 358/1.15
2003/0182378 A1* 9/2003 Treptow et al. ........... 709/206
2004/0137919 A1* 7/2004 Biundo ................... 455/466
2005/0198518 A1* 9/2005 Kogan et al. ............. 713/188

OTHER PUBLICATIONS

Ward, Mark, "More than 95% of email is 'junk'", Jul. 27, 2006, BBC News, http://news.bbc.co.uk/go/pr/fr/-/2/hi/technology/5219554.stm.*

* cited by examiner

*Primary Examiner*—Twyler L Haskins
*Assistant Examiner*—Fred Guillermety
(74) *Attorney, Agent, or Firm*—SoCal IP Law Group LLP; Steven C. Sereboff; Jonathan Pearce

(57) ABSTRACT

The subject application is directed to a mobile document processing system and method. A request for a transient address corresponding to mobile document processing operations is first received from an associated user. Upon receipt of the request, a transient address is generated corresponding to the associated user. Transient address data is then generated for routing electronic documents in accordance with a received document processing request. A document processing request is then received corresponding to a request for the performance of processing of at least one electronic document. The at least one electronic document is then routed to an associated document processing device, data storage device, or facsimile device corresponding to the transient address. The associated document processing device, data storage device, or facsimile device then commences a document processing operation according to the received document processing request. Upon the occurrence of a selected event, the transient address is deleted.

12 Claims, 6 Drawing Sheets

SYSTEM AND METHOD FOR ROUTING ELECTRONIC DOCUMENTS FOR PROCESSING VIA TRANSIENT E-MAIL ADDRESSING

BACKGROUND OF THE INVENTION

The subject application is directed to a system and method for providing mobile document processing services. In particular, the subject application is directed to a system and method for providing mobile document processing services that are accessed by a user via an electronic mail request to the service.

A professional or other mobile user is routinely required to work with documents or other data while away from an office environment. Such a user needs to generate image data, by printing, faxing, storing or scanning a document, and then needs to distribute or perform other functions on such image data. A user may access such document processing services by submitting an electronic mail request to a document processing service or provider. The electronic mail server dedicated to receiving document processing requests for the document processing service will typically receive numerous unsolicited or disruptive electronic mail messages, known as Spam. Spam is generally used to promote a product or service or broadcast some political or social commentary. The efficiency with which the electronic mail server is able to process the document processing requests may be significantly comprised by the receipt of large volumes of such unsolicited electronic mail. Difficulties in remote processing of documents by fee based services are compounded when junk electronic mail is taken into account. Unsolicited electronic mail messages may be routed to a document processing device for printing, facsimile transmission or storage, resulting in unwanted charges for processing of useless, personal or otherwise undesirable electronic mail messages.

SUMMARY OF THE INVENTION

In accordance with one embodiment of the subject application, there is provided a system and method for providing mobile document processing services.

Further, in accordance with one embodiment of the subject application, there is provided a system and method for providing mobile document processing services that are accessed by a user via an electronic mail request to the service.

Further, in accordance with one embodiment of the subject application, there is provided a system and method that allows a user to mobile document processing wherein a document processing request is transmitted to a transient electronic mail address and then routing the request to a document processing device corresponding to the transient address.

Still further, in accordance with one embodiment of the subject application, there is provided a system for a mobile document processing system. The system comprises means adapted for receiving a transient address request for generation of a transient address from an associated user and means adapted for generating transient address data for routing of electronic documents in accordance with a received request. The system further comprises means adapted for receiving a document processing request for processing of at least one electronic document and means adapted for routing the at least one electronic document to an associated document processing device corresponding to the transient address. The system also comprises means adapted for commencing a document processing operation by the associated document processing device in accordance with a received document processing request and means adapted for deleting the transient address upon occurrence of a selected event.

In another embodiment of the subject application, the selected event is suitably an expiration of a selected time period. In another embodiment, the selected event is commencement of a selected number of document processing operations.

In yet another embodiment of the subject application, the transient address data is an electronic mail address associated with the user. Preferably, the transient address includes data representative of an electronic mail server associated with user and identification data associated with the user.

In another embodiment of the subject application, the associated document processing device is at least one device chosen from a set comprising a printer, a facsimile device, and a data storage.

Still further, in accordance with the one embodiment of the subject application, there is provided a method for mobile document processing in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for providing mobile document processing services. In particular, the subject application is directed to a system and method for providing mobile document processing services that are accessed by a user via an electronic mail request to the service. More particularly, the subject application is directed to a system and method for mobile document processing wherein a document processing request is transmitted to a transient electronic mail address and then routing the request to a document processing device corresponding to the transient address. It will become apparent to those skilled in the art that the system and method described herein are suitably adapted to a plurality of varying electronic fields including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
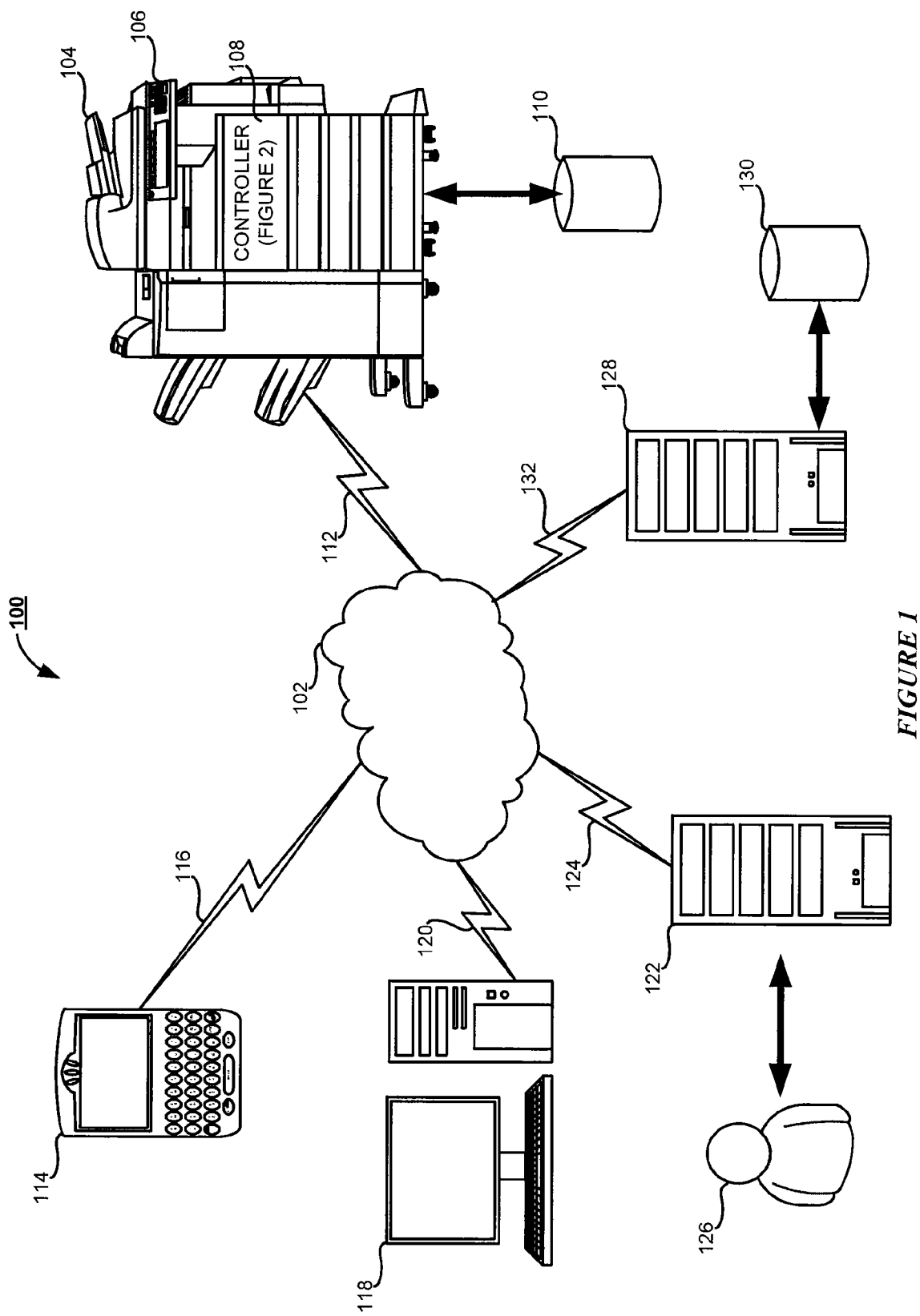
FIG. 1 is an overall diagram of the mobile document processing system according to one embodiment of the subject application.

Referring now to FIG. 1, there is shown an overall diagram of the system 100 for mobile document processing services in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, facilitate electronic mail communications, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the mobile document processing system and method according to one embodiment of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store document data, image data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like. In accordance with one embodiment of the subject application, the data storage device 110 includes, for example and without limitation, electronic mail data, electronic documents, document processing requests, and the like.

Additionally, the system 100 of FIG. 1 includes a portable data device 114, suitably adapted for sending and receiving electronic mail communications, browsing, personal data assistance operations, and the like. As will be appreciated by those skilled in the art, suitable portable data devices include, for example and without limitation, personal data assistants, proprietary network personal communications devices, smart phones, web-enabled cellular telephones, or the like. Preferably, the portable data device 114 is communicatively coupled to the computer network 102 via a communications link 116. It will be understood by those skilled in the art that a suitable communications link includes any wired or wireless data communications mediums known in the art including, for example and without limitation, Bluetooth, WiMax, Wi-Fi, 802.11a, 802.11b, 802.11g, 802.11(x), a proprietary communications network, the public switched telephone network, optical, infrared, or any other suitable data transmission communications known in the art. In accordance with one embodiment of the subject application, a user 126 is capable of requesting a transient address for accessing document processing services via the portable data device 114. It will be appreciated by those skilled in the art that the user 126 is capable of requesting the transient address via a web portal accessed via the computer network 102 through a suitable browser on the portable data device 114, or via telephonic operations through the portable data device 114.

The system 100 illustrated in FIG. 1 further depicts a user device 118, in data communication with the computer network 102 via a communications link 120. It will be appreciated by those skilled in the art that the user device 118 is shown in FIG. 1 as a personal computer for illustration purposes only. As will be understood by those skilled in the art, the user device 118 is representative of any personal computing device known in the art, including, for example and without limitation, a computer workstation, a laptop computer, a personal data assistant, a web-enabled cellular telephone, a smart phone, a proprietary network device, or other web-enabled electronic device. The communications link 120 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 118 is suitably adapted to generate and transmit electronic documents, document processing instructions, document processing requests, electronic mail communications, user interface modifications, upgrades, updates, personalization data, or the like, to the document processing device 104, or any other similar device coupled to the computer network 102.

The system 100 illustrated in FIG. 1 further includes an electronic mail service component, shown as an electronic mail server 122, communicatively coupled to the computer network 102 and adapted to provide electronic mail services to users associated with the mobile document processing system. The electronic mail server 122 is capable of implementation as any hardware, software, or suitable combination thereof, able to perform the functions described hereinafter. Preferably, the electronic mail server 122 is communicatively coupled to the computer network 102 via a suitable communications link 124. As will be understood by those skilled in the art, the communications link 124 includes, for example and without limitation, infrared, optical, 802.11a, 802.11b, 802.11g, 802.11(x), Bluetooth, WiMax, the public switched telephone network, a proprietary communications network, or any other suitable wired or wireless data transmission communications known in the art. The functioning of the electronic mail server 122 is more fully explained in detail below with respect to FIG. 4. In accordance with one embodiment of the subject application, the electronic mail server 122 is suitably adapted to provide transient electronic mail addresses to requesting users 126, via the public switched telephone network, to requesting devices 114 and 118 via the computer network 102, and the like. Preferably, the electronic mail server 122 is further capable of functioning as a mail server as are known in the art.

The system 100 further illustrates a network storage server 128 coupled to a data storage device 130. Preferably, the network storage server 128 is representative of any network storage device known in the art capable of storing document data, image data, video data, sound data, multimedia data, or other suitable electronic data, as will be known in the art. In accordance with one embodiment of the subject application, the data storage device 130 includes a plurality of electronic data, including image data, document data, or the like. The network storage server 128 is communicatively coupled to the computer network 102 via a suitable communications link 132. As will be understood by those skilled in the art, the communications link 132 includes, for example and without limitation a proprietary communications network, infrared, optical, Bluetooth, WiMax, 802.11a, 802.11b, 802.11g, 802.11(x), the public switched telephone network, or any suitable wireless data transmission system, or wired communications known in the art.

Figure 2:
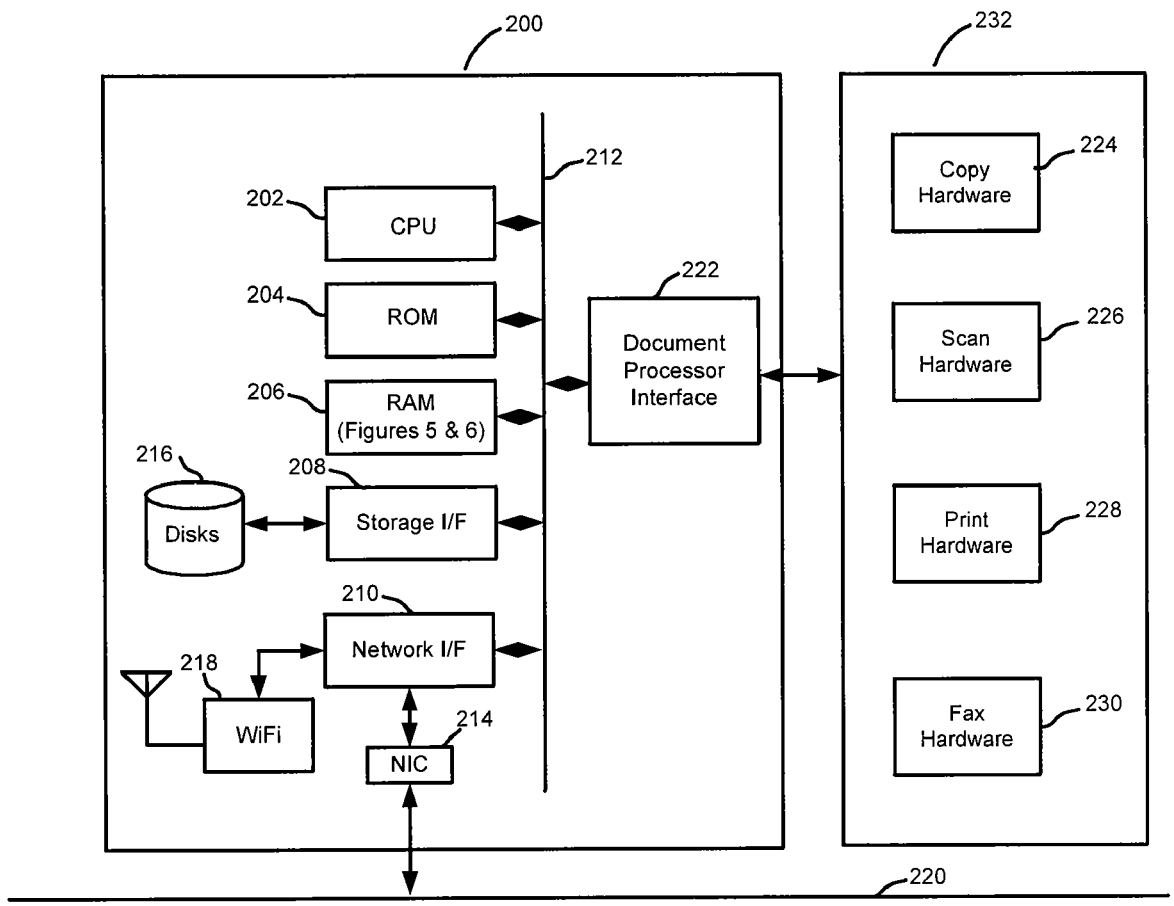
FIG. 2 is a block diagram illustrating controller hardware for use in the mobile document processing system according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Also in data communication with bus the 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that a controller suitably operates any or all of the aforementioned document processing operations. Systems accomplishing more than one document processing operation are commonly referred to as multifunction peripherals or multifunction devices.

Figure 3:
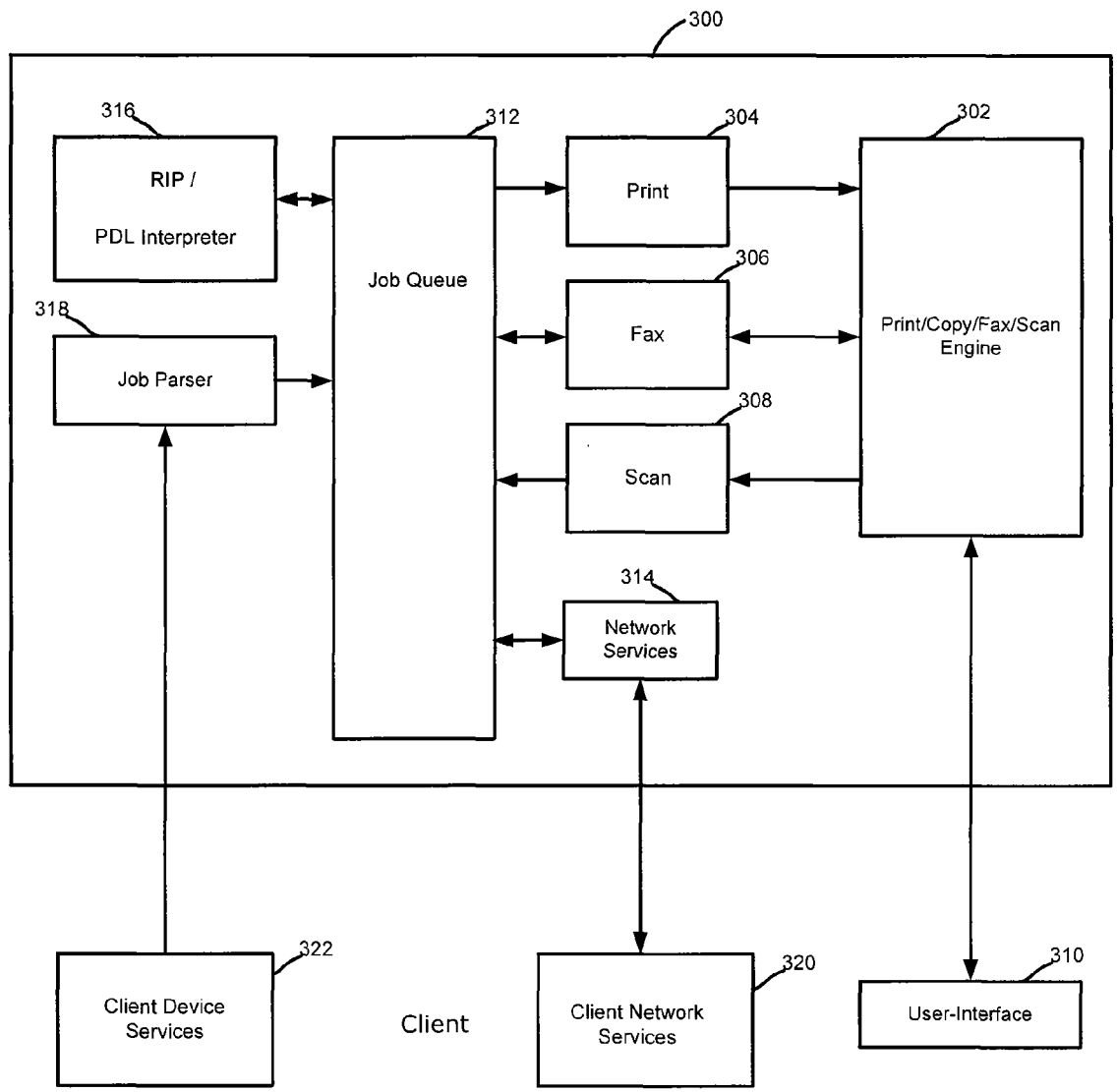
FIG. 3 is a functional diagram illustrating the controller for use in the mobile document processing system according to one embodiment of the subject application.

Functionality of the subject system 100 is accomplished on a suitable document processing device, such as the document processing device 104, which includes the controller 200 of FIG. 2, (shown in FIG. 1 as the controller 108) as an intelligent subsystem associated with the document processing device 104. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image processor, page description language interpreter or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The Parser 318 functions to interpret a received electronic document file and relay it to the job queue 312 for handling in connection with the afore-described functionality and components.

Figure 4:
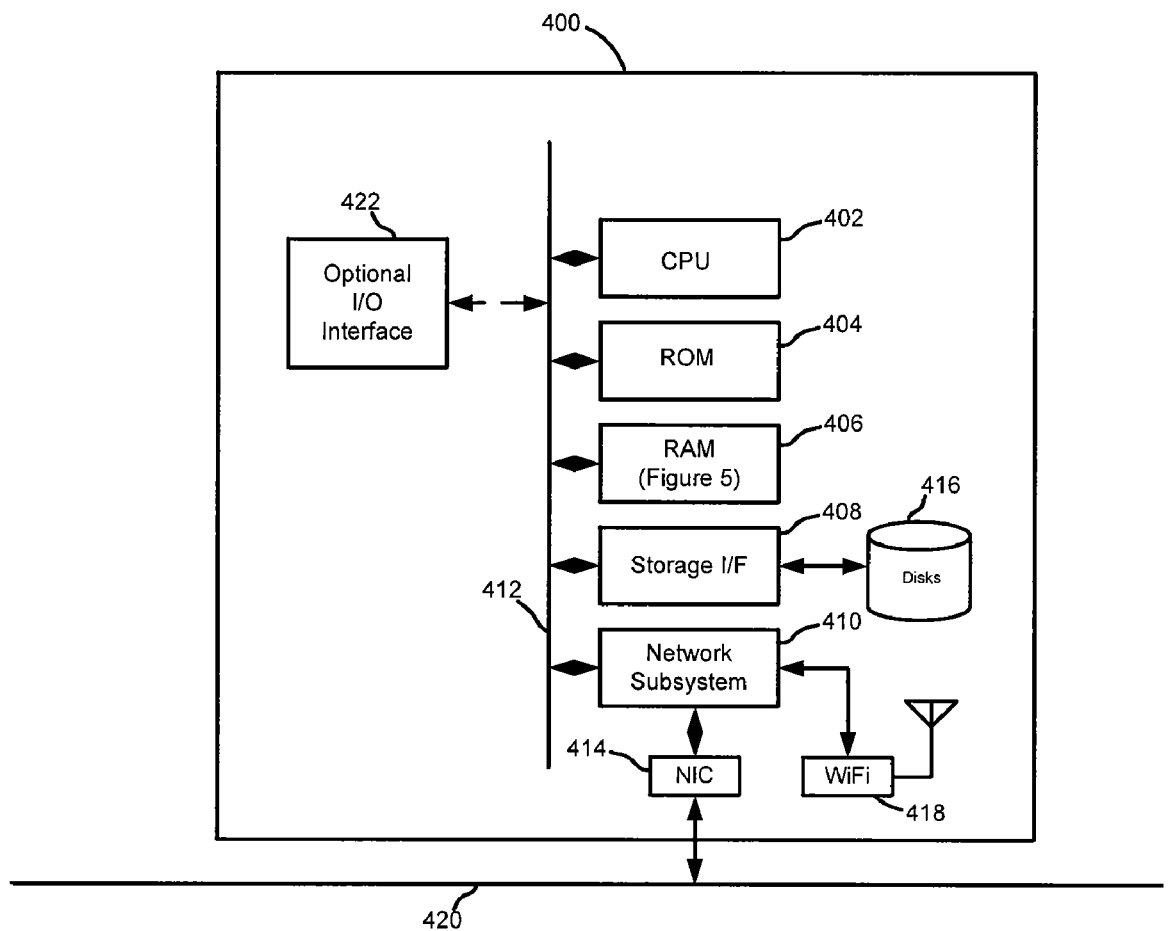
FIG. 4 is a block diagram illustrating a server for use in the mobile document processing system according to one embodiment of the subject application.

Turning now to FIG. 4, illustrated is a representative architecture of a suitable server 400 on which operations of the subject system are completed. Included is a processor 402, suitably comprised of a central processor unit. However, it will be appreciated that the processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration, and other routines or data used for operation of the server 400.

Also included in the server 400 is random access memory 406, suitably formed of dynamic random access memory, static random access memory, or any other suitable, addressable memory system. Random access memory provides a storage area for data instructions associated with applications and data handling accomplished by the processor 402.

A storage interface 408 suitably provides a mechanism for volatile, bulk or long term storage of data associated with the server 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the server 400 to communicate to other devices. The network interface subsystem 410 suitably interfaces with one or more connections with external devices to the server 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network subsystem 410 is suitably accomplished via a bus data transfer mechanism, such as illustrated by bus 412.

Suitable executable instructions on the server 400 facilitate communication with a plurality of external devices, such as workstations, document processing devices, other servers, or the like. While, in operation, a typical server operates autonomously, it is to be appreciated that direct control by a local user is sometimes desirable, and is suitably accomplished via an optional input/output interface 422 as will be appreciated by one of ordinary skill in the art.

In operation, a request for a transient address is received for the generation of a transient address from an associated user. Transient address data is then generated for routing of electronic documents in accordance with a received request. Next, a document processing request is received corresponding to a request for processing of at least one electronic document. The at least one electronic document is then routed to an associated document processing device corresponding to the transient address. The associated document processing device then commences a document processing operation according to the received document processing request. The transient address is deleted upon the occurrence of a selected event.

In accordance with one example embodiment of the subject application, a user 126, via telephone connection with the mail server 122, via telephone connection through the portable data device 114, or via a web browser operating on the portable data device 114 or the user device 118, requests a transient electronic mail address corresponding to a spam-free electronic mail address administered by the server 122 for mobile document processing services. Preferably, the user 126 is registered to use the mobile document processing system, e.g., is authenticated/authorized via suitable authentication mechanisms, as will be appreciated by those skilled in the art. According to one embodiment of the subject application, a voice processing component resident on the mail server 122 is suitably adapted to enable a registered user to request and receive a transient address via the public switched telephone network or other voice-enabled communications network. Preferably, when a voice request is received by the mail server 122, a transient address is communicated to the user 126 at an electronic mail address associated with the registered user 126. Similarly, the user 126 is able to request a transient address via a web portal, hosted by the mail server 122 or by a server (not shown) in secure data communication with the mail server 122.

The mail server 122 then generates, upon the request of the registered user 126, a transient address corresponding to an electronic mail address to which the user 126 is able to forward a document processing request. In accordance with one embodiment of the subject application, the transient address includes, for example and without limitation, a permanent address associated with the mail server 122 and a transient account identification associated with the transient address request from the registered user 126. When the user 126 makes such a transient address request, the user 126 is prompted, via telephonic means, i.e., voice or image, or graphical means, i.e., via an associated user interface on a web browser, to specify the delivery method for the transient address, i.e., display the transient address to the user 126 via an associated interface, or electronically mail the transient address to the user 126 at a preselected electronic mail address.

The user 126 receives the transient address via the portable data device 114, the personal computer 118, or the like, from the mail server 122 through a suitable communications link. A document processing request is then generated via any suitable means known in the art and sent to the transient address. It will be appreciated by those skilled in the art that the transient address is capable of, but is not limited to, designating the document processing device 104 as the recipient of the message, designating the mail server 122, which further functions to forward document processing requests to the document processing device 104, designating the network storage server 128 for storing an electronic document, or the like. Preferably, the document processing request is sent to the transient address in the form of an electronic mail message, such as an attachment or included within the body of the message. As will be appreciated by those skilled in the art, the document processing request suitably designates an electronic document for processing, which document is capable of being stored locally on the personal computer 118, stored on the portable data device 114, stored on the data storage device 110, stored on some other networked storage server 128, or the like. In accordance with one embodiment of the subject application, the transient address denotes a particular document processing device 104 for performance of document processing services. As will be appreciated by those skilled in the art, the document processing request is capable of comprising an electronic mail message, wherein subject field of the message includes an identification of an associated document processing device or storage device, or the like.

The document processing request, inclusive of either an identification of an electronic document or the electronic document itself, is then received by the mail server 122 via the computer network 102. The mail server 122 then routes the received document processing request to the transient address. As will be understood by those skilled in the art, such routing includes, for example and without limitation, routing to a mailbox on the mail server 122 routinely accessed by the designated document processing device 104, a mailbox on the mail server 122 capable of being accessed from a document processing device, e.g., 104, by the user 126, routing directly to a mailbox resident on the designated document processing device 104, or the like. In accordance with one embodiment of the subject application, once the mail server 122 has received the document processing request, a receipt is generated and returned to the originating device, e.g., the portable data device 114 or the user device 118, indicating that the document processing request has been received by the mail server 122 or the document processing device 104, as determined by the transient address.

As will be appreciated by those skilled in the art, upon receipt of the document processing request, the document processing device 104 is capable of immediately performing the requested document processing operation on the designated electronic document or storing the request and associated document until such time as a release is obtained to perform the document processing operation. For example, and without limitation, the document processing device 104 is capable of retrieving a designated electronic document and storing the document in the data storage device 110 until such time as the user 126 inputs a release command remotely via the user device 118 or the portable data device 114, or via the user interface 106. As an additional example, the document processing device 104 is capable of immediately commencing the requested document processing operation upon receipt of the request at the transient address.

The mail server 122 then determines whether a selected event has occurred and based on the occurrence of the selected event, deletes the transient address. As will be appreciated by those skilled in the art, suitable selected events include, for example and without limitation, an expiration of a selected time period, the performance of a selected number of document processing operations, a cancellation request by an associated user, or the like. Once this event has occurred, the mail server 122 disables the transient address and the associated user 126 must request a new transient address for future document processing requests.

Figure 5:
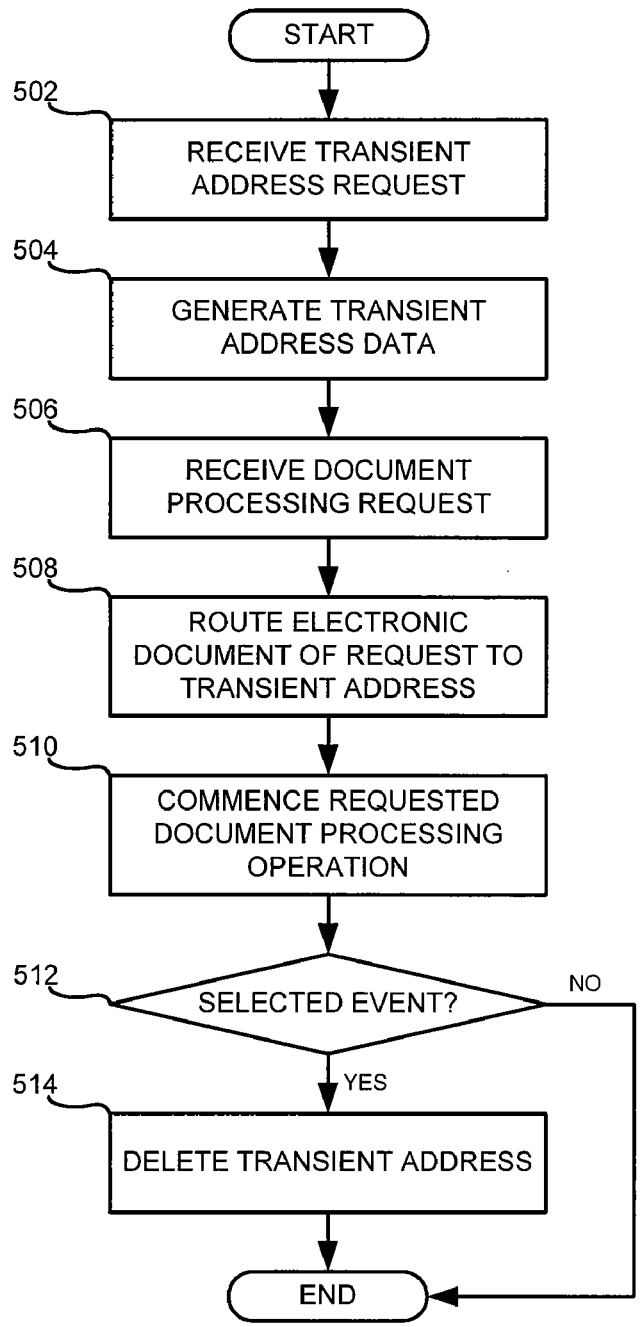
FIG. 5 is a flowchart illustrating a mobile document processing method according to one embodiment of the subject application.

The skilled artisan will appreciate that the subject system 100 and components described above with respect to FIG. 1, FIG. 2, FIG. 3, and FIG. 4 will be better understood in conjunction with the methodologies described hereinafter with respect to FIG. 5 and FIG. 6. Turning now to FIG. 5, there is shown a flowchart 500 illustrating a mobile document processing method in accordance with one embodiment of the subject application. Beginning at step 502, a transient address request is received for generation of a transient address from the associated user 126. As discussed above, suitable requests are capable of being communicated to the server 122 via voice, e.g., telephonic communication from the user 126, via the network 102, e.g., from the portable data device 114 or the user device 118 using a suitable web browser or other communicative interface, or the like. At step 504, the server generates transient address data for the routing of electronic documents in accordance with a received document processing request. A document processing request is then received corresponding to the processing of at least one electronic document at step 506.

The at least one electronic document associated with the received document processing request is then routed at step 508 to the associated document processing device 104, the network storage server 128, or the like, corresponding to the transient address. The receiving device, e.g., the document processing device 104 or the data storage device 128, then commences performance of the document processing operation associated with the received document processing request. A determination is then made by the mail server 122 whether a selected event has occurred at step 512. It will be appreciated by those skilled in the art that suitable events include, for example and without limitation, the expiration of a selected time period, the commencement of a selected number of document processing operations, a deletion request from the user 126 or a suitable authorized administrator, or the like. When it is determined at step 512 that no such event has occurred, the operation terminates. When it is determined at step 512 that the selected event has occurred, flow proceeds to step 514, whereupon the transient address is deleted from the mail server 122.

Figure 6:
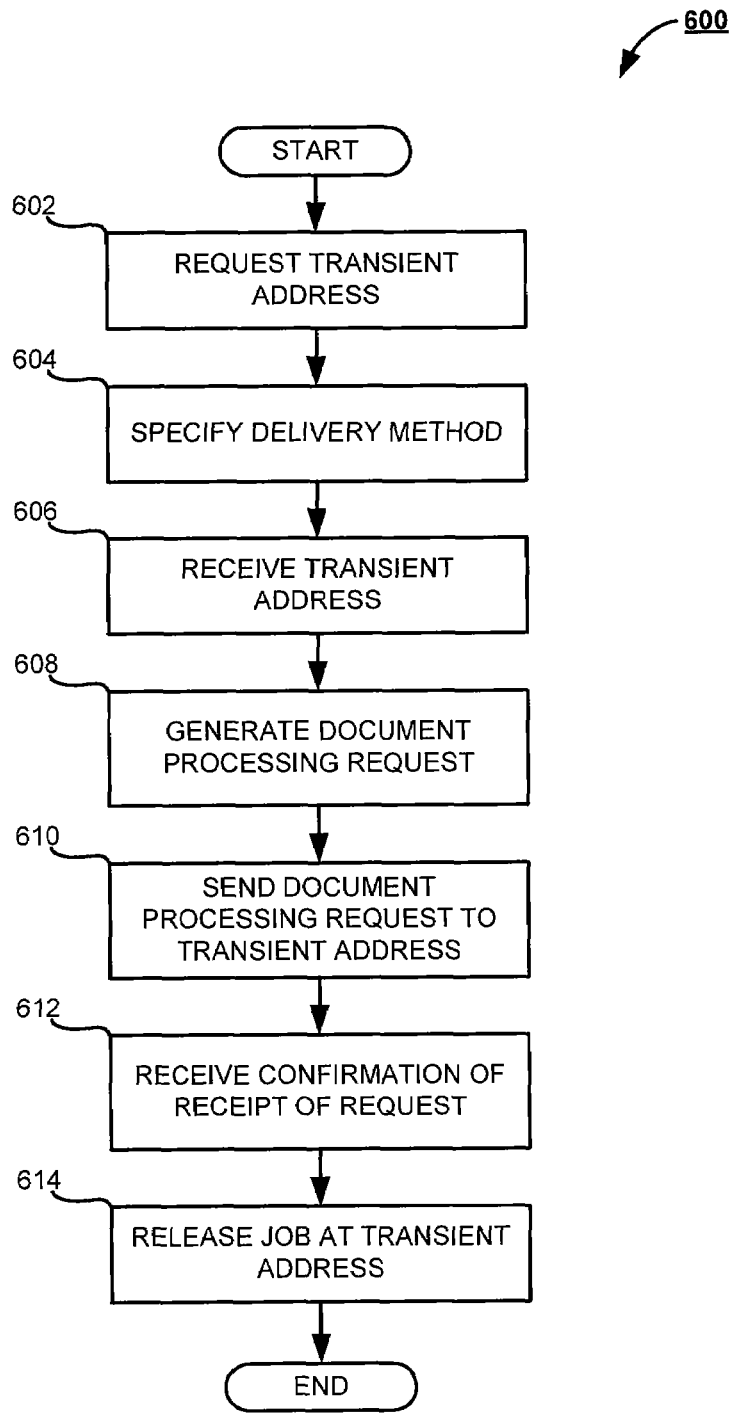
FIG. 6 is a flowchart illustrating a mobile document processing method from a client side perspective according to one embodiment of the subject application.

Referring now to FIG. 6, there is shown a flowchart 600 illustrating a client side perspective of a mobile document processing method in accordance with one embodiment of the subject application. The method begins at step 602, wherein an associated user 126, via the portable data device 114, the user device 118, a voice request, or the like, requests a transient address for mobile document processing services. At step 604, a delivery method corresponding to the transient address is selected. For example, the user 126 is capable of specifying that the transient address be sent, via electronic mail, to the electronic mail address associated with the user 126, or the user specifies that the transient address be displayed via a suitable web browser, or the like.

A transient address is then received from the mail server 122 at step 606 corresponding to an address associated with the user and mobile document processing operations. A document processing request is then generated at step 608 corresponding to a selected document processing operation to be performed on at least one selected electronic document. In accordance with one embodiment of the subject application, the at least one electronic document is capable of being retrieved from a local storage of the data storage device 110, the portable data device 114, or the user device 118, from network storage device 128, facsimile transmission, or the like. The document processing request is then communicated at step 610 to the transient address via the computer network 102.

A receipt is then received from the document processing device 104, the mail server 122, or the network storage server 128 corresponding to the transient address indicating confirmation of the receipt of the document processing request at step 612. The document processing request, or job, is then released at the associated document processing device 104 via the associated user interface 106, or remotely with respect to storage or facsimile operations at step 614. Thereafter, the device associated with the transient address then commences performance of the document processing operation corresponding to the received document processing request.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A mobile document processing system comprising:
means adapted for receiving a transient address request for generation of a transient address from an associated user via a non electronic mail data interchange into a document processing gateway associated with a document processing device;
means adapted for generating, at the document processing gateway, transient address data for routing of electronic documents in accordance with a received request;
means adapted for receiving a document processing request for processing of at least one electronic document from the associated user via the data interchange;
means adapted for routing the at least one electronic document to an associated document processing device from the document processing gateway to the transient address;
a user interface associated with the document processing device and operable to access document processing functionality thereof;
means adapted for receiving a release command from a user associated with the electronic document via the user interface;
means adapted for commencing a document processing operation by the associated document processing device in accordance with a received document processing request wherein a document output is generated in accordance with a received release command; and
means adapted for deleting the transient address upon occurrence of a selected event.

2. The mobile document processing system of claim 1 wherein the selected event is an expiration of a selected time period.

3. The mobile document processing system of claim 1 wherein the selected event is commencement of a selected number of document processing operations.

4. The mobile document processing system of claim 1 wherein the transient address data is an electronic mail address associated with the user.

5. The mobile document processing system of claim 4 wherein the transient address includes data representative of an electronic mail server associated with user and identification data associated with the user.

6. The mobile document processing system of claim 1 wherein the associated document processing device is at least one device chosen from a set comprising a printer, a facsimile device, and a data storage.

7. A mobile document processing method comprising the steps of:
receiving a transient address request for generation of a transient address from an associated user via a non-electronic mail data interchange into a document processing gateway associated with a document processing device, wherein the document processing device includes a user interface operable to access document processing functionality thereof;
generating, at the document processing gateway, transient address data for routing of electronic documents in accordance with a received request;
receiving a document processing request for processing of at least one electronic document from the associated user via the data interchange;
routing the at least one electronic document to an associated document processing device from the document processing gateway to the transient address;
receiving a release commend from a user associated with the electronic document via the user interface;
commencing a document processing operation by the associated document processing device in accordance with a received document processing request wherein a document output is generated in accordance with a received release command; and
deleting the transient address upon occurrence of a selected event.

8. The mobile document processing method of claim 7 wherein the selected event is an expiration of a selected time period.

9. The mobile document processing method of claim 7 wherein the selected event is commencement of a selected number of document processing operations.

10. The mobile document processing method of claim 7 wherein the transient address data is an electronic mail address associated with the user.

11. The mobile document processing method of claim 10 wherein the transient address includes data representative of an electronic mail server associated with user and identification data associated with the user.

12. The mobile document processing method of claim 7 wherein the associated document processing device is at least one device chosen from a set comprising a printer, a facsimile device, and a data storage.

* * * * *